United States Patent
Yadav et al.

(10) Patent No.: US 12,513,163 B2
(45) Date of Patent: Dec. 30, 2025

(54) METHODS AND SYSTEMS FOR DETECTING DATA ABUSE AND DATA EXFILTRATION IN DATA LAKES CLOUD WAREHOUSES

(71) Applicant: Theom, Inc., San Jose, CA (US)

(72) Inventors: Navindra Yadav, Cupertino, CA (US); Supreeth Hosur Nagesh Rao, Cupertino, CA (US); Ravi Kanth Sankuratri, Cupertino, CA (US); Danesh S. Irani, San Carlos, CA (US); Alok Lalit Wadhwa, Milipitas, CA (US); Vasil Dochkov Yordanov, San Jose, CA (US); Venkateshu Cherukupalli, West Windsor, NJ (US); Yiwei Wang, San Jose, CA (US); Zhiwen Zhang, San Jose, CA (US); Udayan Pramod Joshi, Cupertino, CA (US)

(73) Assignee: Theom, Inc., San Jose, CA (US)

( * ) Notice: Subject to any disclaimer, the term of this patent is extended or adjusted under 35 U.S.C. 154(b) by 2 days.

(21) Appl. No.: 18/235,349

(22) Filed: Aug. 18, 2023

(65) Prior Publication Data

US 2024/0056460 A1    Feb. 15, 2024

Related U.S. Application Data

(63) Continuation-in-part of application No. 18/203,045, filed on May 29, 2023, which is a continuation-in-part of application No. 17/335,932, filed on Jun. 1, 2021, now Pat. No. 12,010,124.

(60) Provisional application No. 63/439,579, filed on Jan. 18, 2023, provisional application No. 63/153,362, filed on Feb. 24, 2021.

(51) Int. Cl.
*H04L 9/40* (2022.01)
*G06F 21/64* (2013.01)

(52) U.S. Cl.
CPC .......... *H04L 63/1416* (2013.01); *G06F 21/64* (2013.01); *H04L 63/1425* (2013.01)

(58) Field of Classification Search
CPC .. H04L 63/1416; H04L 63/1425; G06F 21/64
See application file for complete search history.

(56) References Cited

U.S. PATENT DOCUMENTS

| | | | |
|---|---|---|---|
| 2014/0344931 A1* | 11/2014 | Edwards | G06F 21/552 726/23 |
| 2018/0018469 A1* | 1/2018 | Moss | H04L 9/14 |
| 2020/0045064 A1* | 2/2020 | Bindal | G06N 20/00 |

* cited by examiner

*Primary Examiner* — Thaddeus J Plecha
(74) *Attorney, Agent, or Firm* — Young Basile Hanlon & MacFarlane, P.C.

(57) ABSTRACT

In one aspect, a computerized method for detecting data abuse and data exfiltration in a data store or a data lakes cloud warehouse, comprising: identifying a plurality of Command and control (CnC) channels in an enterprise data cloud infrastructure; identifying and detecting malicious compressed data transfers and encrypted data transfers; implementing a destination analysis from within the data store; and implementing data abuse detection and prevention operations.

20 Claims, 22 Drawing Sheets

METHODS AND SYSTEMS FOR DETECTING DATA ABUSE AND DATA EXFILTRATION IN DATA LAKES CLOUD WAREHOUSES

CLAIM OF PRIORITY

This application claims priority to U.S. Provisional Application No. 63/439,579, filed on 18 Jan. 2023 and titled DATA STORE ANALYSIS METHODS AND SYSTEMS. This provisional application is hereby incorporated by reference in its entirety.

This application claims priority to the U.S. patent application Ser. No. 18/203,045, filed on 29 May 2023 and titled METHODS AND SYSTEMS FOR ATTACK GENERATION ON DATA LAKES. The U.S. patent application Ser. No. 18/203,045 is hereby incorporated by reference in its entirety.

U.S. patent application Ser. No. 18/203,045 claims priority to the U.S. patent application Ser. No. 17/335,932, filed on Jun. 1, 2021 and titled METHODS AND SYSTEMS FOR PREVENTION OF VENDOR DATA ABUSE. The U.S. patent application Ser. No. 17/335,932 is hereby incorporated by reference in its entirety.

U.S. patent application Ser. No. 17/335,932 application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This utility patent application is incorporated herein by reference in its entirety.

FIELD OF INVENTION

This application is related to cloud-platform security and, more specifically, a method and system for detecting data abuse and data exfiltration in data lakes cloud warehouses.

BACKGROUND

Data is the most critical asset of any enterprise. Almost all cyber security tools and techniques invented and deployed to date focus on protecting the data by proxy. They either focus on protecting the server/application or the endpoints (e.g. desktop, laptop, mobile, etc.) and, by proxy, assume the data is protected. A paradox in the cyber security industry is that data breaches are growing and measured by any metric with every passing day. Despite more money and resources being deployed into cyber security solutions, existing approaches must be revised, begging for a new solution.

SUMMARY OF THE INVENTION

In one aspect, a computerized method for detecting data abuse and data exfiltration in a data store or a data lakes cloud warehouse, comprising: identifying a plurality of Command and control (CnC) channels in an enterprise data cloud infrastructure; identifying and detecting malicious compressed data transfers and encrypted data transfers; implementing a destination analysis from within the data store; and implementing data abuse detection and prevention operations.

Figure 1:
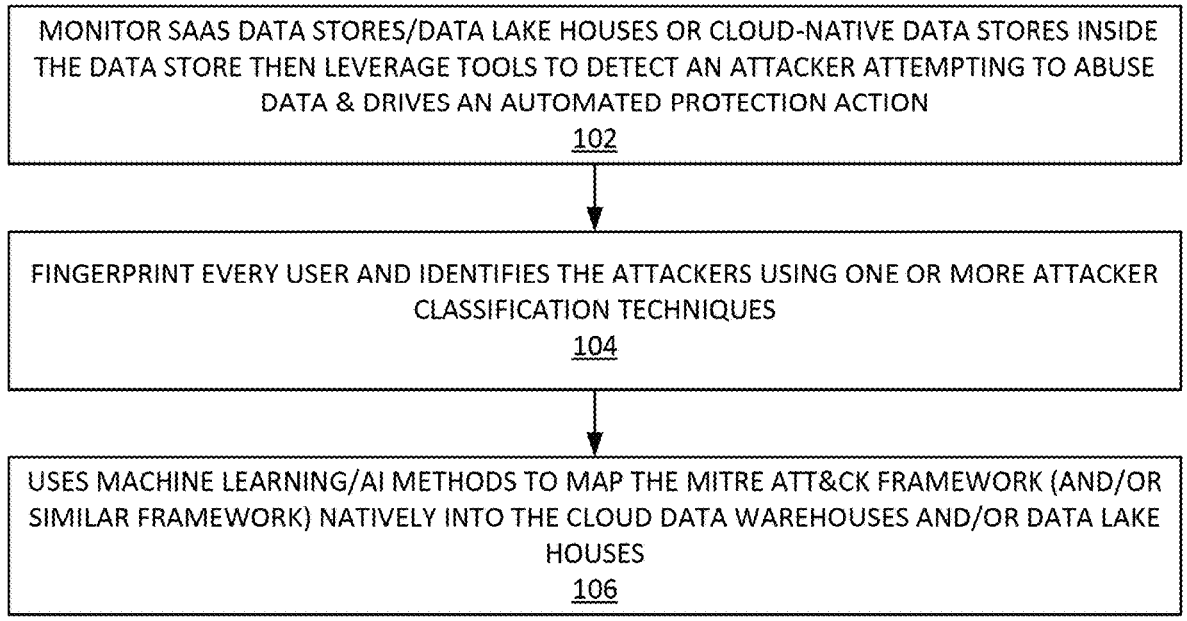
FIG. 1 illustrates an example process for detecting data abuse and data exfiltration in data lakes cloud warehouses, according to some embodiments.

The Figures described above are a representative set and are not exhaustive with respect to embodying the invention.

DESCRIPTION

Disclosed are a system, method, and article for detecting data abuse and data exfiltration in data lakes cloud warehouses. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' an 'embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. However, one skilled in the relevant art can recognize that the invention may be practiced without one or more of the specific details or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

CIA triad (confidentiality, integrity and availability) of information security.

Cloud computing is the on-demand availability of computer system resources, especially data storage (e.g. cloud storage) and computing power, without direct active management by the user.

Cloud database is a database that typically runs on a cloud computing platform and access to the database is provided as-a-service.

Cloud storage is a model of computer data storage in which the digital data is stored in logical pools, said to be on "the cloud". The physical storage spans multiple servers (e.g. in multiple locations), and the physical environment is typically owned and managed by a hosting company. These cloud storage providers can keep the data available and accessible, and the physical environment secured, protected, and running.

Cloud data warehouse is a cloud-based data warehouse. Cloud data warehouse can be used for storing and managing large amounts of data in a public cloud. Cloud data warehouse can enable quick access and use of an entity's data.

Command and control can be a technique used by threat actors to communicate with compromised devices over a network.

Cyber Kill Chain® framework is part of the Intelligence Driven Defense® model for identification and prevention of cyber intrusions activity. The model identifies what the adversaries must complete in order to achieve their objective.

Dark web is the World Wide Web content that exists on darknets: overlay networks that use the Internet but require specific software, configurations, or authorization to access. Through the dark web, private computer networks can communicate and conduct business anonymously without divulging identifying information, such as a user's location.

Data Bounty can be a financial or other reward available for sourcing a specific dataset.

DBaaS (Database as a Service) can be a cloud computing service that provides access to and use a cloud database system.

Data lake is a system or repository of data stored in its natural/raw format. A data lake can be object blobs or files. A data lake is usually a single store of data including raw copies of source system data, sensor data, social data etc. A data lake can include various transformed data used for tasks such as reporting, visualization, advanced analytics, and machine learning. A data lake can include structured data from relational databases (rows and columns), semi-structured data (e.g. CSV, logs, XML, JSON), unstructured data (e.g. emails, documents, PDFs) and binary data (e.g. images, audio, video). A data lake can be established "on premises" (e.g. within an organization's data centers) or "in the cloud" (e.g. using cloud services from various vendors).

Malware is any software intentionally designed to disrupt a computer, server, client, or computer network, leak private information, gain unauthorized access to information or systems, deprive access to information, or which unknowingly interferes with the user's computer security and privacy. Researchers tend to classify malware into one or more sub-types (e.g. computer viruses, worms, Trojan horses, ransomware, spyware, adware, rogue software, wiper and keyloggers).

MITRE ATT&CK® is a guideline/framework for classifying and describing cyberattacks and intrusions. The MITRE ATT&CK® is a guideline/framework that can include fourteen (14) tactics categories consisting of technical objectives of an adversary. Examples can include privilege escalation and command and control. These categories can then broken down further into specific techniques and sub-techniques. A MITRE ATT&CK® Matrix can be used herein in some example embodiments. The MITRE ATT&CK® Matrix contains information for various platforms, including, inter alia: Windows, macOS, Linux, PRE, Azure AD, Office 365, Google Workspace, SaaS, IaaS, Network, Containers. These can include, inter alia: Reconnaissance techniques, Resource Development techniques, Initial Access techniques, Execution techniques, Persistence techniques, Privilege Escalation techniques, Defense Evasion techniques, Credential Access techniques, Discovery techniques, Lateral Movement techniques, Collection techniques, Command and Control techniques, Exfiltration techniques, Impact techniques, etc. It is noted that other frameworks (e.g. other Adversarial Tactics, Techniques, and Common Knowledge frameworks, etc.) can be used in other example embodiments.

NIST Cybersecurity Framework is a set of guidelines for mitigating organizational cybersecurity risks, published by the US National Institute of Standards and Technology (NIST) based on existing standards, guidelines, and practices. The framework "provides a high-level taxonomy of cybersecurity outcomes and a methodology to assess and manage those outcomes", in addition to guidance on the protection of privacy and civil liberties in a cybersecurity context.

Privilege escalation can be the act of exploiting a bug, a design flaw, or a configuration oversight in an operating system or software application to gain elevated access to resources that are normally protected from an application or user. The result can be that an application with more privileges than intended by the application developer or system administrator can perform unauthorized actions.

Security orchestration, automation, and response (SOAR) can be a set of applications that collect data from disparate sources and automatically respond to security events. SOAR collects inputs monitored by the security operations team such as alerts from the SIEM system, TIP, and other security technologies and helps define, prioritize, and drive standardized incident response activities. Organizations uses SOAR platforms to improve the efficiency of digital security operations. SOAR enables administrators to handle security alerts without the need for manual intervention. When the network tool detects a security event, depending on its nature, SOAR can raise an alert to the administrator or take some other action.

Tactics, techniques, and procedures (TTPs) are the "patterns of activities or methods associated with a specific threat actor or group of threat actors.

Example Methods

FIG. 1 illustrates an example process for detecting data abuse and data exfiltration in data lakes cloud warehouses, according to some embodiments. Process 100 can detect data abuse and data exfiltration techniques and tactics.

In step 102, process 100 monitors the SaaS data stores/data lake houses (e.g. Snowflake®, DataBricks®, AWS RedShift®, Azure Synapse®, GCP BigQuery®, etc.) or cloud-native data stores inside the data store. Step 102 can then leverage various tools (e.g. machine-learning tools, etc.) to detect an attacker (e.g. human or malware) attempting to abuse data and drives an automated protection action.

In step 104, process 100 fingerprints every user and identifies the attackers using one or more attacker classification techniques. Process 100 also use various techniques of attacker classification. For example, process 100 can examine the Tactics, Technique, and Procedure (TTP) of the attack sequence inside the data store. Process 100 can use a MITRE ATT&CK® framework and the like.

In step 106, process 100 uses machine learning/AI methods to map the MITRE ATT&CK® framework (and/or similar framework) natively into the cloud data warehouses and/or data lake houses. This enables uses to gain data visibility, operationalize best practices, intervene early before an incident occurs, and advance detection of data abuse and exfiltration techniques. It is noted that other frameworks can be used in other example embodiments (e.g. CYBER KILL CHAIN®, NIST CSF®, etc.).

Figure 2:
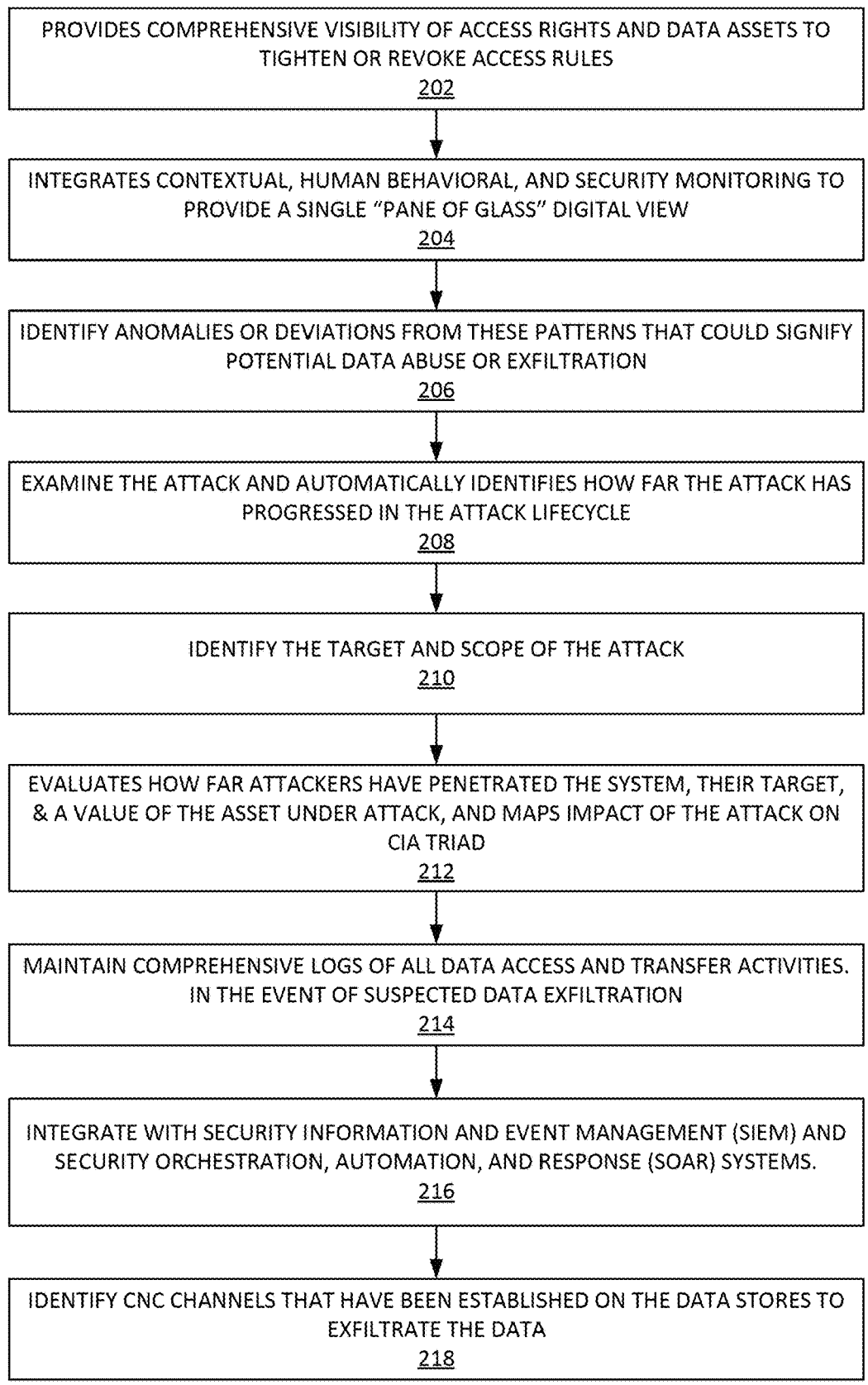
FIG. 2 illustrates another example process for detecting data abuse and data exfiltration in data lakes cloud warehouses, according to some embodiments.

FIG. 2 illustrates another example process 200 for detecting data abuse and data exfiltration in data lakes cloud warehouses, according to some embodiments. In step 202, process 200 provides comprehensive visibility of access rights and data assets to tighten or revoke access rules, thereby also building a fingerprint for every user's access. In step 204, process 200 seamlessly integrates contextual, human behavioral, and security monitoring to provide a single "pane of glass" digital view. Through this view, a user can examine insider risks from every possible angle. In this way, process 200 unifies these approaches to detect malicious activity natively on data stores. Activity that can lead to data abuse and exfiltration on the data lakes.

By understanding the normal usage patterns of each user or role, in step 206, process 200 can identify anomalies or deviations from these patterns that could signify potential data abuse or exfiltration. This can include such events as, inter alia: unusual login times, multiple login attempts, access to sensitive data that is not usually accessed by the user, or an unusually high volume of data transfer.

Process 200 can be implemented by an intrusion detection and protection system embedded into the data store and is well dispersed in the data stores watches every interaction with the data and identifies what's normal for what type of role and user with what type of data. The moment the malware or malicious human tries to access or manipulate data or the structure of the data or policies/governance constructs surrounding the data, the system in real-time swings into action with a very tailored plus measured response to neutralize the damage.

In step 208, process 200 examines the attack and automatically identifies how far the attack has progressed in the attack lifecycle (e.g. an attack kill chain). This is important as it gives a sense of response time to the humans protecting the system when operating process 200 (and/or process 100, etc.) defenses in a manual or hybrid mode. It can inform users the amount of time that left/remaining before any damage from the attackers becomes permanent.

Figure 3:
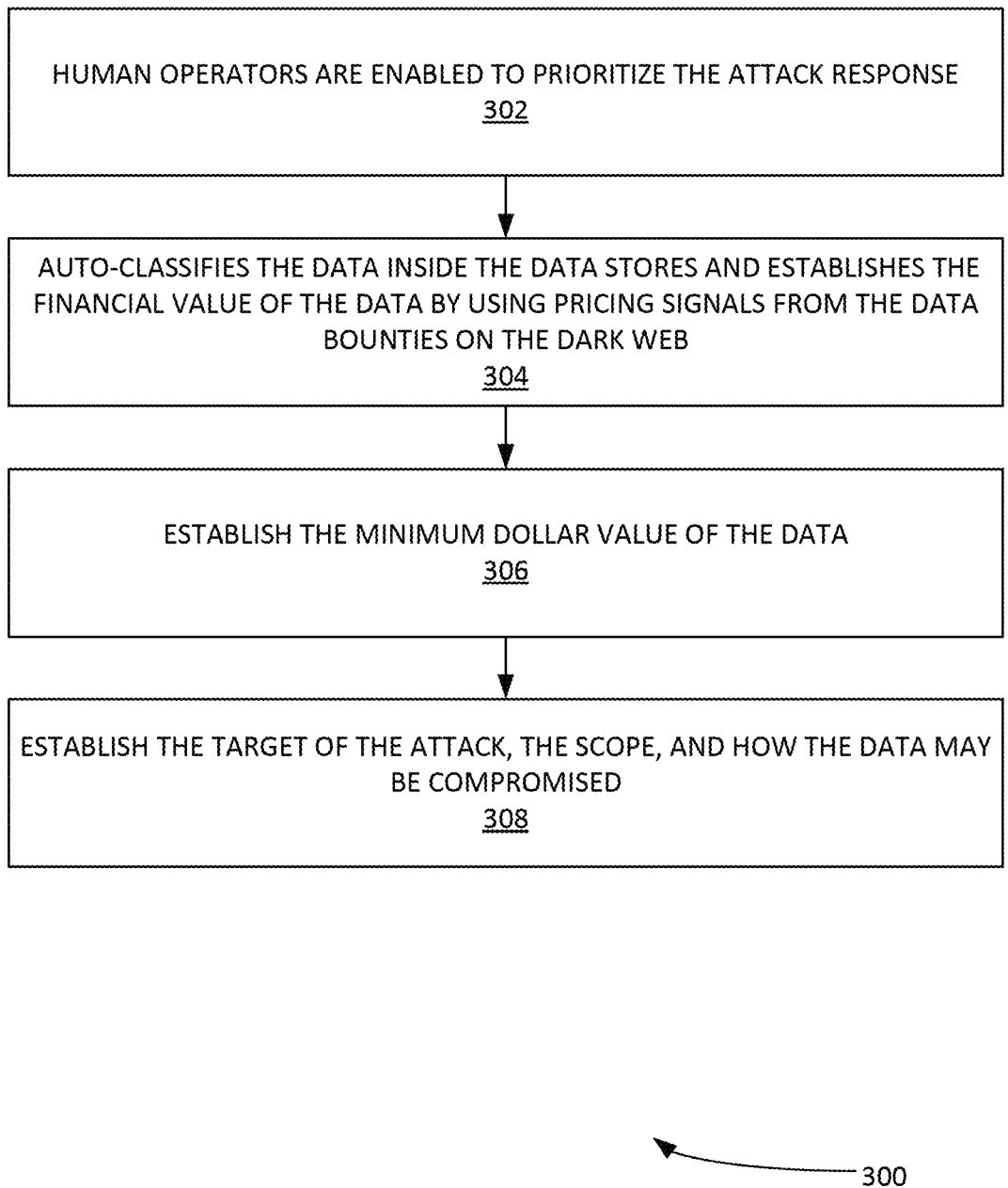
FIG. 3 illustrates an example process for identifying the target and scope of the attack, according to some embodiments.

In step 210, process 200 also identifies the target and scope of the attack. Step 210 can implement process 300. FIG. 3 illustrates an example process 300 for identifying the target and scope of the attack, according to some embodiments. In step 302, human operators are enabled to prioritize the attack response. This is because process 200 assesses the impact of the attack and the ramifications of the attack. In step 304, process 300 auto-classifies the data inside the data stores and establishes the financial value of the data by using pricing signals from the data bounties on the dark web. Process 300 establishes the minimum dollar value of the data in step 306. Further, by examining the sequence of attack steps/commands being executed, process 300 establishes the target of the attack, the scope, and how the data may be compromised in step 308. This can include, inter alia: confidentiality (e.g. data leak), integrity (e.g. data maliciously be manipulated), availability (e.g. ransomware) of the data being compromised.

In step 212, process 200 evaluates how far the attackers have penetrated the system and what seems to be their target, establishes the value of the asset the attackers are after, and maps the impact of the attack on the CIA triad. This enables security practitioners to look at the attack as it builds out and take the remediation action with full view.

In step 214, process 200 maintains comprehensive logs of all data access and transfer activities. In the event of suspected data exfiltration. These audit trails can be reviewed to trace the actions back to the source and understand the full context of the incident.

In step 216, process 200 integrates with Security Information and Event Management (SIEM) and Security Orchestration, Automation, and Response (SOAR) systems. These integrations allow process 200 to leverage additional threat intelligence and response capabilities. If a potential threat is detected, these systems can initiate automatic or manual responses to address the threat situation quickly.

Process 200 can also analyze various attackers' techniques that lead to data abuse and exfiltration attempts. Specifically, process 200 can identify CnC (Command and control) channels that might have been established on the data stores to exfiltrate the data in step 218. These CnC can have various levels of stealth depending on the victim (e.g. an enterprise's) network structure, application footprint, and/or governance (or lack of) processes.

Figure 4:
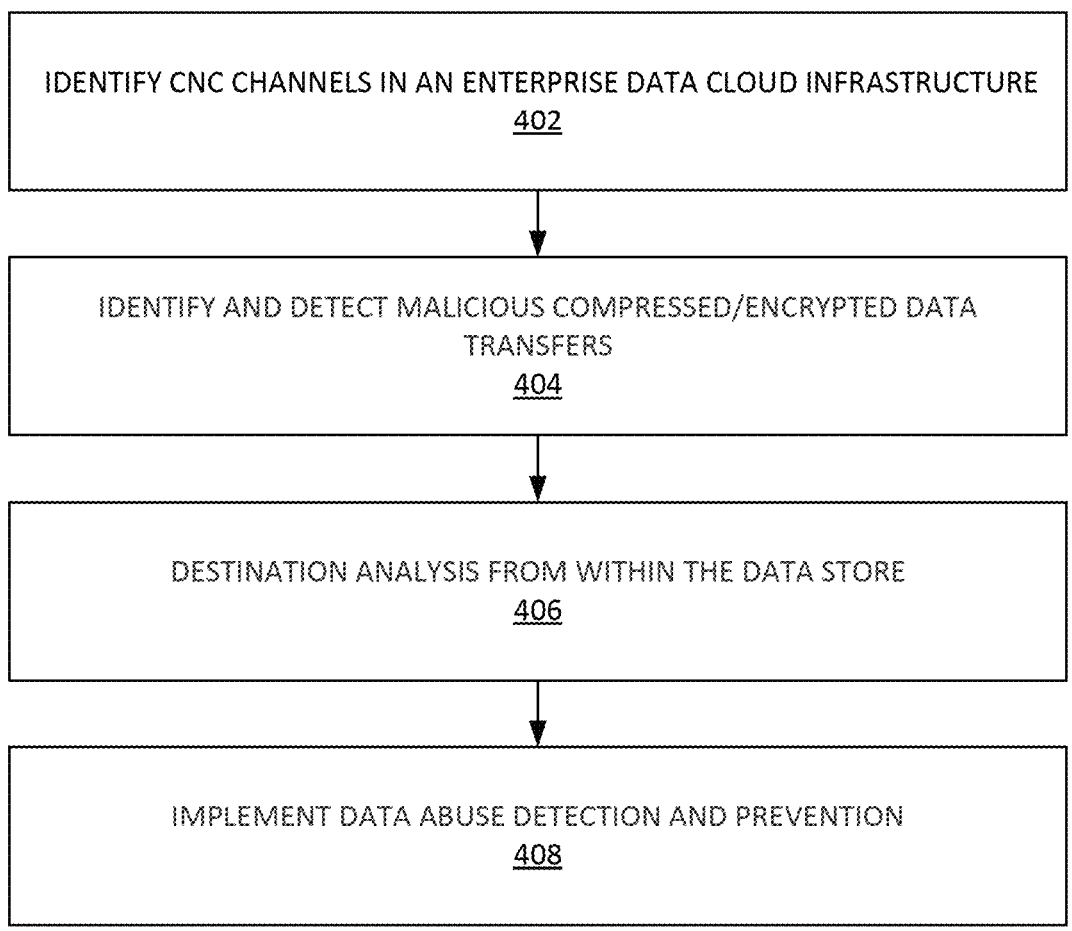
FIG. 4 illustrates an example process for detecting data abuse and data exfiltration in data lakes cloud warehouses, according to some embodiments.

FIG. 4 illustrates an example process 400 for detecting data abuse and data exfiltration in data lakes cloud warehouses, according to some embodiments. In step 402, process 400 identifying CnC channels in an enterprise data cloud infrastructure, according to some embodiments.

Figure 5:
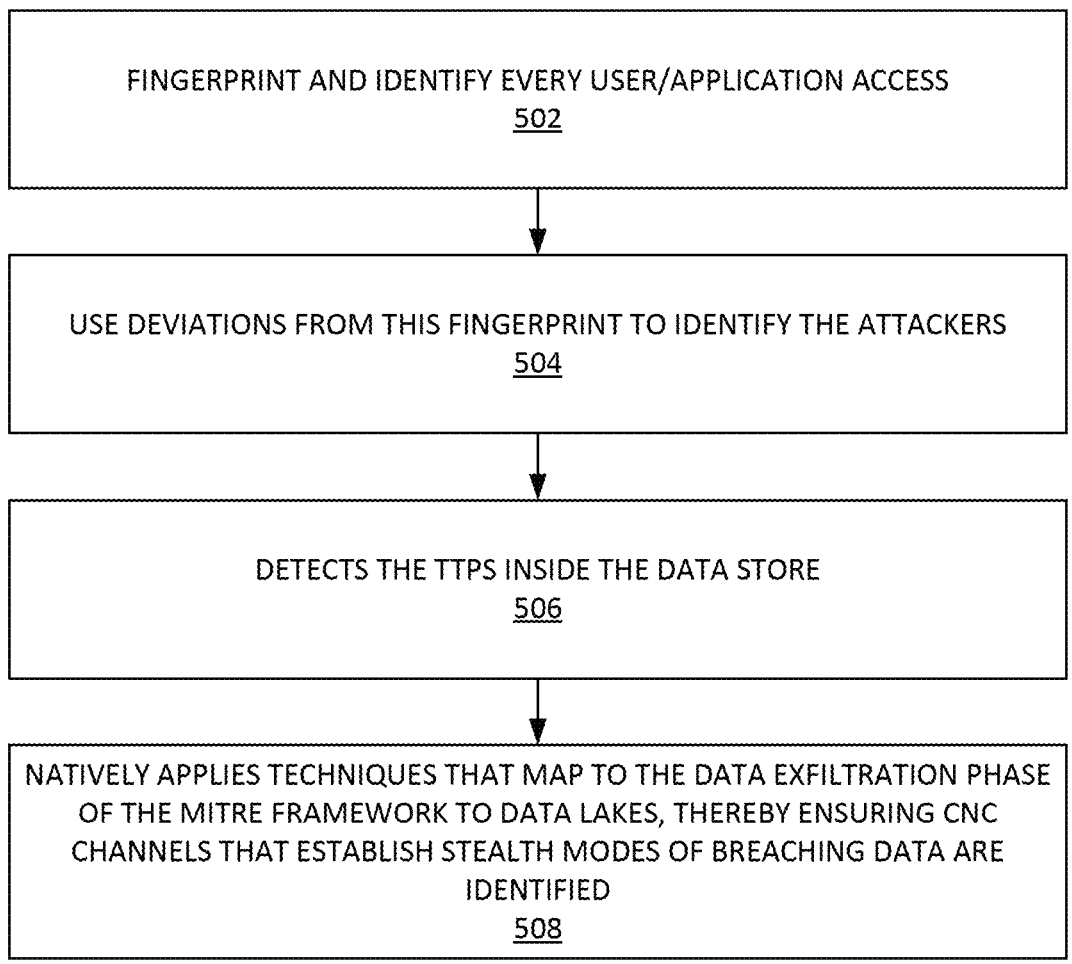
FIG. 5 illustrates an example process for identifying CnC channels in an enterprise data cloud infrastructure, according to some embodiments.

FIG. 5 illustrates an example process 500 for identifying CnC channels in an enterprise data cloud infrastructure, according to some embodiments. In step 502, process 500 fingerprints and identifies every user/application access. In step 504, using deviations from this fingerprint, process 500 identifies the attackers. Process 500 can various techniques of attacker classification by examining the Tactics, Technique, and Procedure (TTP) of the attack sequence. In step 506, process 500 detects the TTPs inside the data store. Process 500 implements attack detection and classification from a MITRE ATT&CK framework (e.g. as discussed supra) and/or other relevant attack detection and classification frameworks. In step 508, process 500 natively applies techniques that map to the data exfiltration phase of the MITRE framework to data lakes, thereby ensuring CnC channels that establish stealth modes of breaching data are identified.

Figure 21:
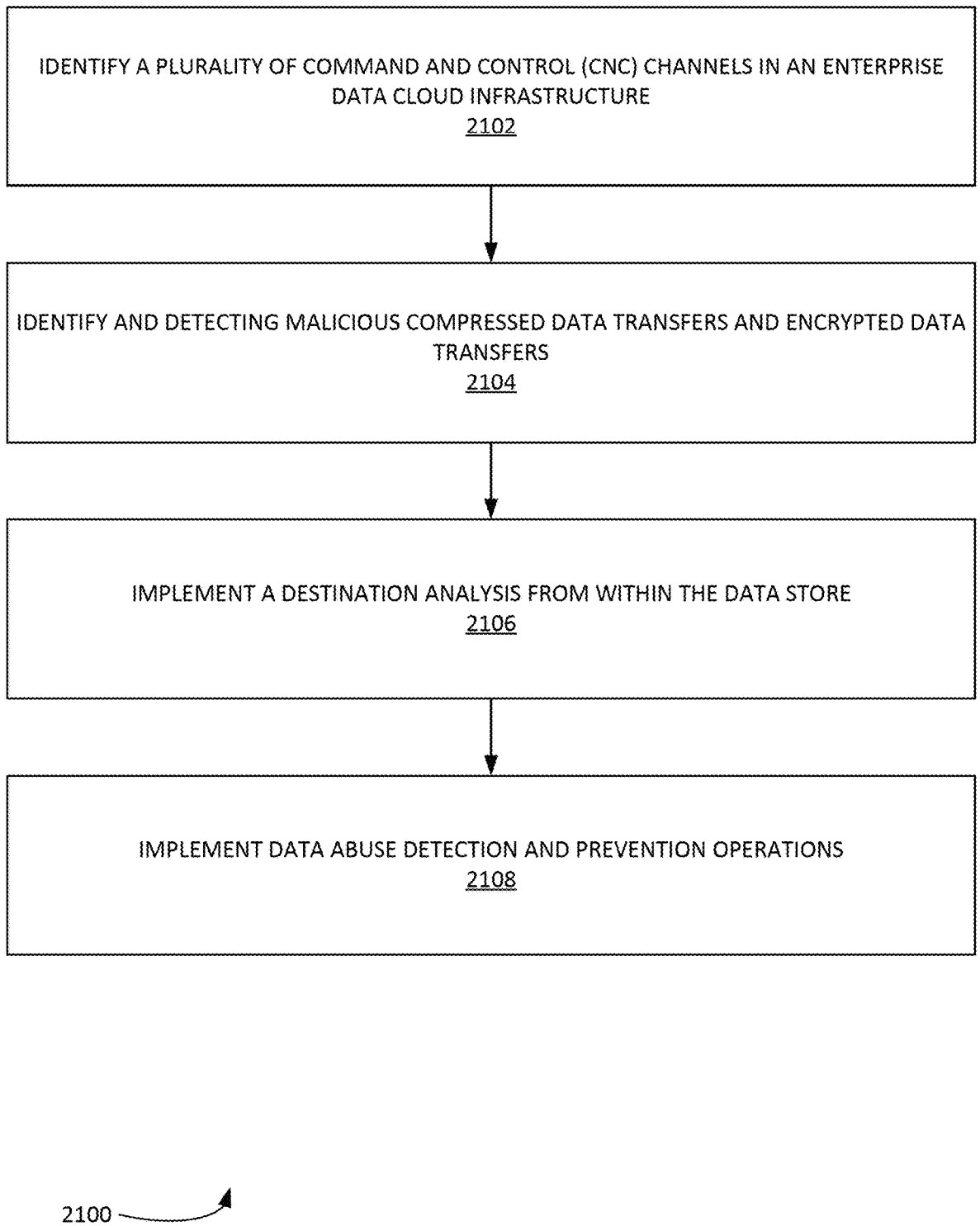
FIG. 21 illustrates an example process used herein, according to some embodiments.

FIG. 21 illustrates example process 2100 for implementing TTPs that are adapted to a cloud data warehouse context to identify data abuse and exfil, according to some embodiments. In step 2102, process 2100 identifies CnC. Here, process 2100 fingerprints and identifies every user/application access. Using deviations from this fingerprint, process 2100 identifies the attackers. Process 2100 uses the well-known technique of attacker classification by examining the Tactics, Technique, and Procedure (UP) of the attack sequence. Process 2100 detects the TTPs inside the data store, which has never been successfully done. This is akin to identifying the RNA sequences and mutations of the covid viruses to identify the various mutations and evolution of the covid virus variants. The gold standard of attack detection and classification derives from the MITRE ATT&CK framework here. Process 2100 natively applies techniques that map to the data exfiltration phase of the MITRE framework to data lakes, thereby ensuring CnC channels that establish stealth modes of breaching data are identified.

In step 2104, process 2100 identifies and detects malicious compressed/encrypted data xfers. In this phase of the attack, the attacker or malware does two things, modifies stages and controls that can transfer data out, and then creates a path out. Secondly, the attacker or malware encrypts or compresses data using techniques that can appear right to existent posture management systems. If the user/attacker uses his/her own keys to encrypt data, process 2100 can identify that such a "unblessed" or a private key is used, and the data can become a pawned data set. Process 2100 tracks lineage for such targeted data set and has workflows to quarantine such data sets.

In step 2106, process 2100 implements destination analysis from within the data store. Process 2100 integrates with threat intelligence feeds to identify known malicious IP addresses or domains. If data is being transferred to a known malicious destination, this would certainly trigger an alert/remediation workflow within the applicable system. Process 2100 does this analysis of identifying a malicious IP from within the data store.

Process 2100 analyzes the destination of data transfers. If compressed or encrypted data is sent to unknown, untrusted, or suspicious destinations (such as unfamiliar IP addresses, foreign countries, or cloud storage services), a potential data breach could be indicative and process 2100 stops such a breach.

In step 2108, Process 2100 implements data abuse detection and prevention. Process 2100 fingerprints user behavior with respect to tables/views accessed, queries run, partitions accessed, time of day, day of week and many more to determine if the access of a specific user is being abused. Process 2100 associates every such abuse with a money value of data to make the impact analysis on such an abuse actionable. Process 2100 understands users' behavior with respect to the larger roles that the user belongs to and can therefore find users who are not behaving similar to others within the roles they belong to.

In step 404, process 400 identifies and detects malicious compressed/encrypted data transfers.

Figure 6:
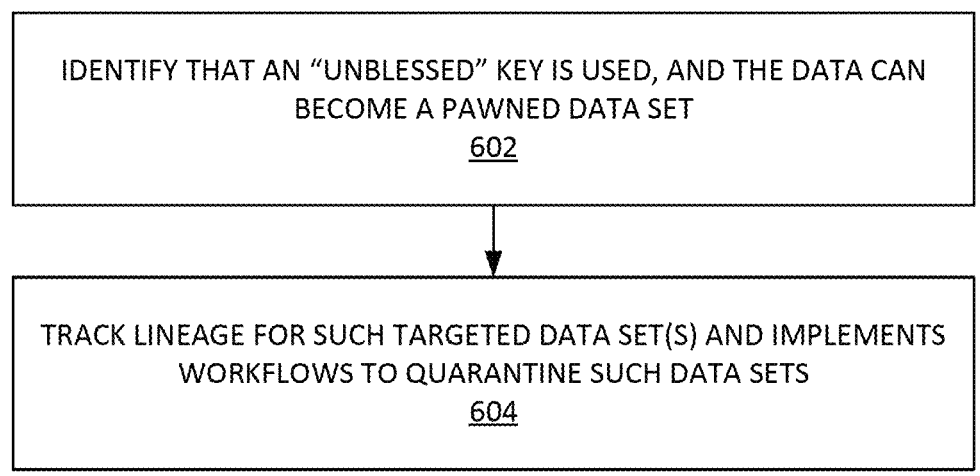
FIG. 6 illustrates an example process for identifying and detecting malicious compressed/encrypted data transfers, according to some embodiments.

FIG. 6 illustrates an example process 600 for identifying and detecting malicious compressed/encrypted data transfers, according to some embodiments. It is noted that in this phase of the attack, the attacker or malware does two things, modifies stages and controls that can transfer data out (e.g. creates a path out, etc.). Secondly, the attacker encrypts or compresses data using techniques that can appear right to extant posture management systems. If the user/attacker uses his/her own keys to encrypt data, process 600 can identify that such a "unblessed" key is used, and the data can become a pawned data set in step 602. In step 604, process 600 tracks lineage for such targeted data set(s) and implements workflows to quarantine such data sets.

Unblessed key here indicates a private key that the attacker uses to encrypt the data. Once the data is encrypted, the payload is now not readable, and it becomes a pawned data asset. This can be dumped out on cloud blob stores and further moved out of the "blessed" or monitored enterprise network. Even tools like CSPM would not act on this as it's an encrypted payload and the techniques to determine if the key is indeed a valid one or not (e.g. which was used to encrypt) might be out of scope for the CSPM. With process 400, once the attacker enters a new key to encrypt the payload, its tracked and the workflows/tooling ensures that the pawned key and the subsequent targeted data payload are protected.

Figure 7:
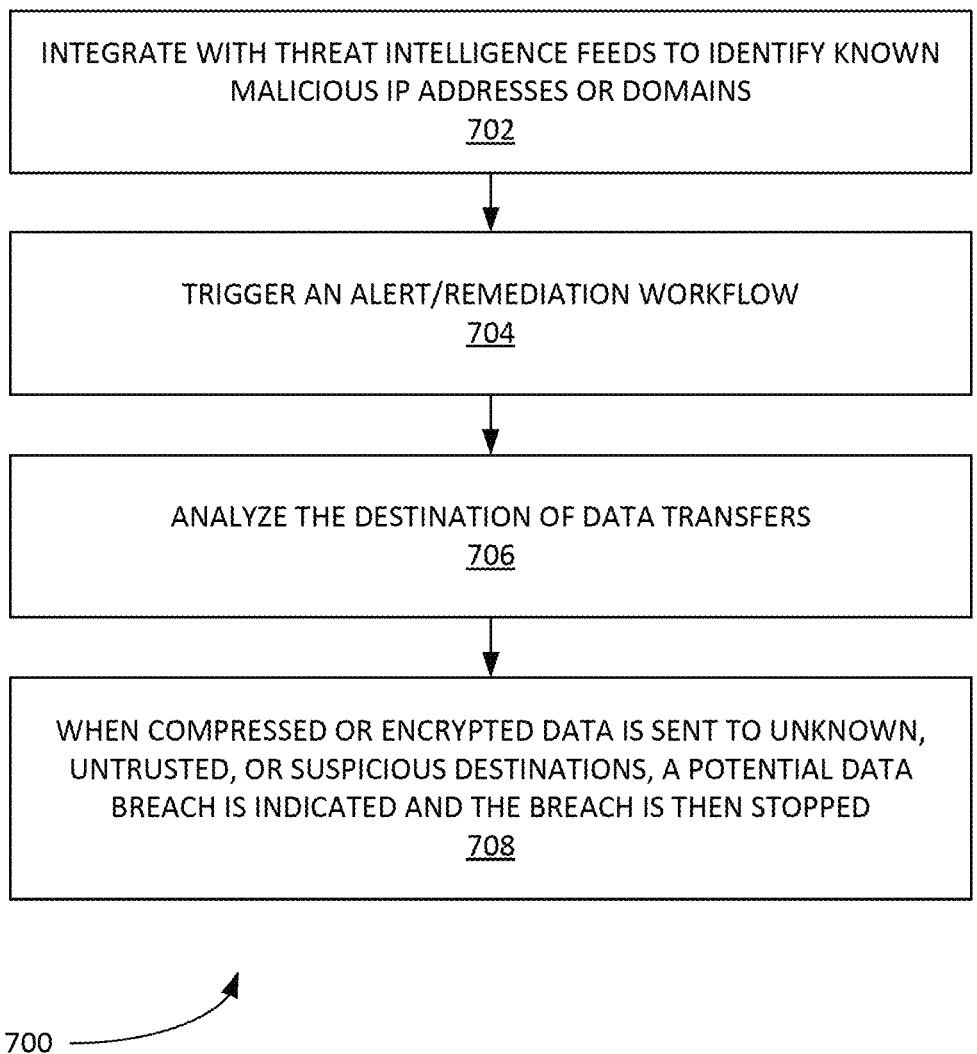
FIG. 7 illustrates an example process for implementing destination analysis from within the data store, according to some embodiments.

In step 406, process 400 implements destination analysis from within the data store as well. FIG. 7 illustrates an example process 700 for implementing destination analysis from within the data store, according to some embodiments. In step 702, process 700 integrates with threat intelligence feeds to identify known malicious IP addresses or domains. If data is being transferred to a known malicious destination, in step 704, process 700 triggers an alert/remediation workflow. Process 700 performs this analysis of identifying a malicious IP from within the data store. In step 706, process 700 analyzes the destination of data transfers. If compressed or encrypted data is sent to unknown, untrusted, or suspicious destinations (e.g. unfamiliar IP addresses, foreign countries, or cloud storage services, etc.), a potential data breach could be indicated and process 700 stops such a breach in step 708.

Figure 8:
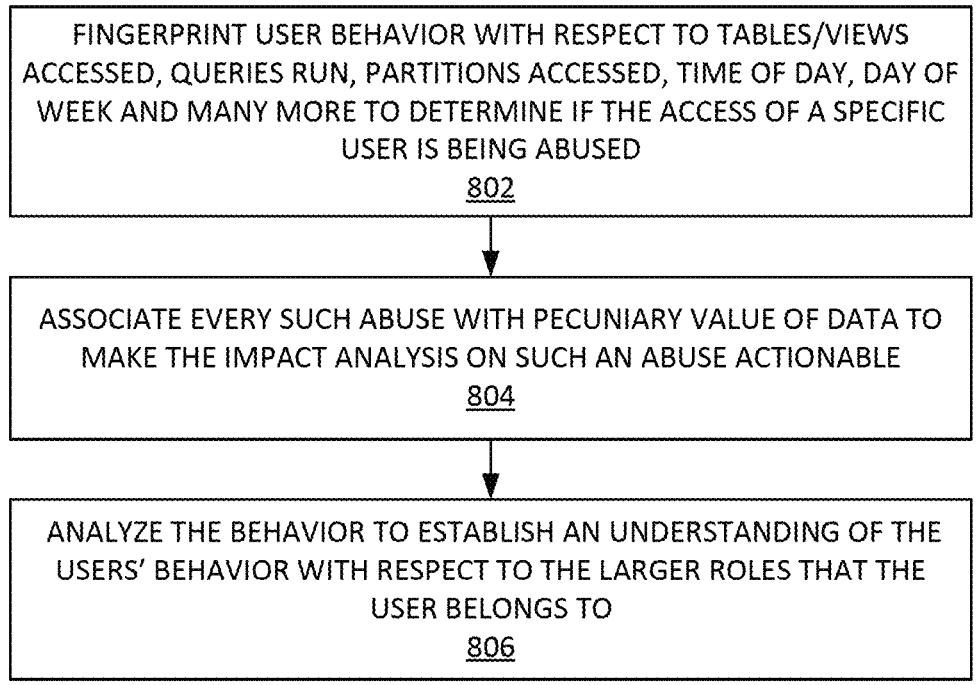
FIG. 8 illustrates an example process for implementing data abuse detection and prevention operations, according to some embodiments.

In step 408, process 400 implements data abuse detection and prevention operations. FIG. 8 illustrates an example process 800 for implementing data abuse detection and prevention operations, according to some embodiments. In step 802, process 800 fingerprints user behavior with respect to tables/views accessed, queries run, partitions accessed, time of day, day of week and many more to determine if the access of a specific user is being abused. Process 800 may include generating a list of specific user abuses. In step 804, process 800 associates every such abuse with pecuniary value of data to make the impact analysis on such an abuse actionable. In step 806, process 800 analyzes the behavior to establish an understanding of the users' behavior with respect to the larger roles that the user belongs to and can therefore find users who are not behaving similar to others within the roles they belong to.

It is noted that cyber-attacks can be modeled/classified into seven phases (e.g. Phase 1: Reconnaissance and target selection Phase 2: Initial access Phase 3: Lateral movement and privilege escalation Phase 4: Deployment of ransomware payload Phase 5: Encryption and impact Phase 6: Extortion and communication Phase 7: Recovery and mitigation Know your enemy). The present processes can be focused on phase 5 of this model, the Encryption and impact phase.

Figure 9:
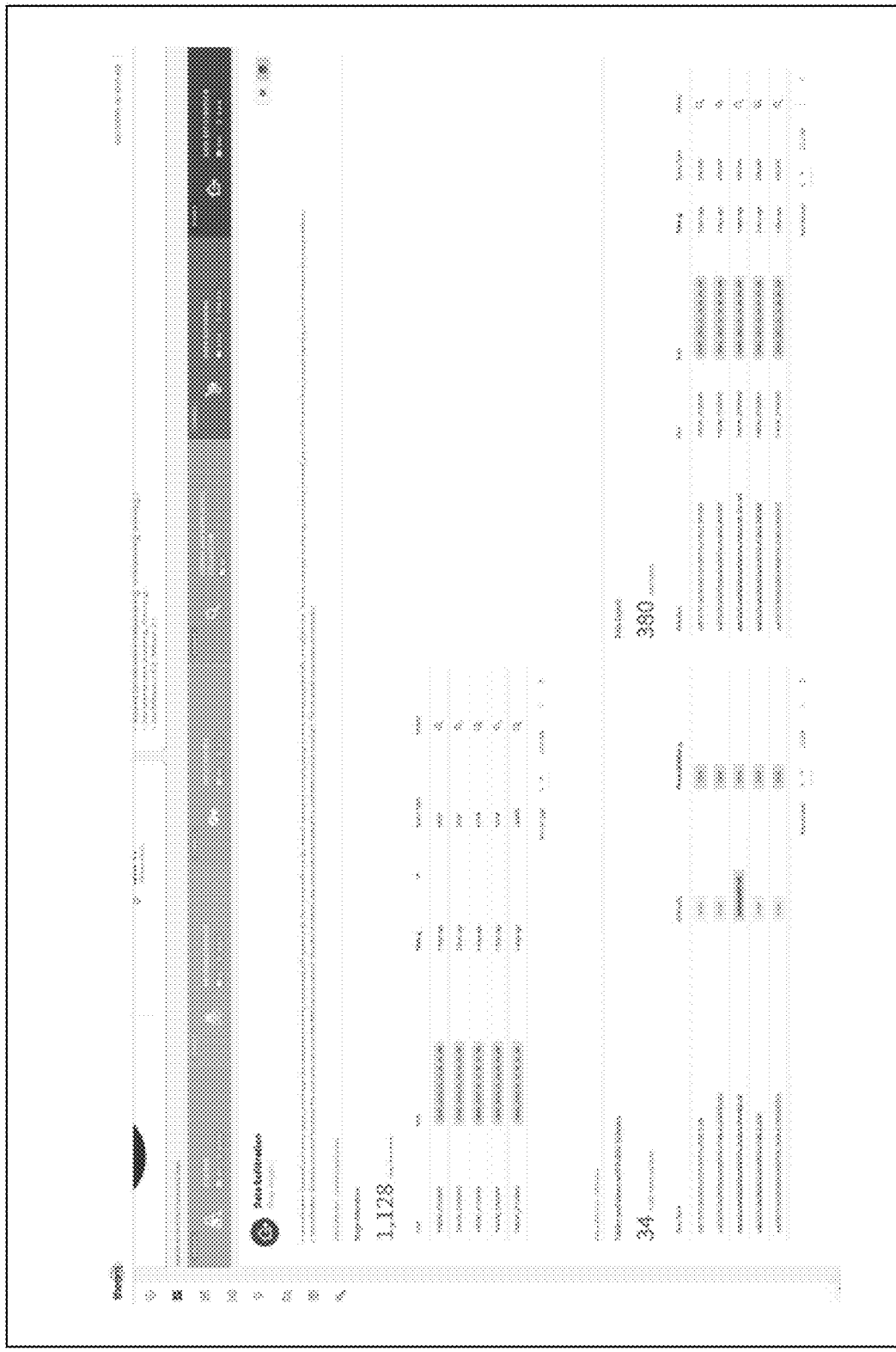
FIGS. 9-10 illustrate screenshots of data exfiltration information, according to some embodiments.
Figure 10:
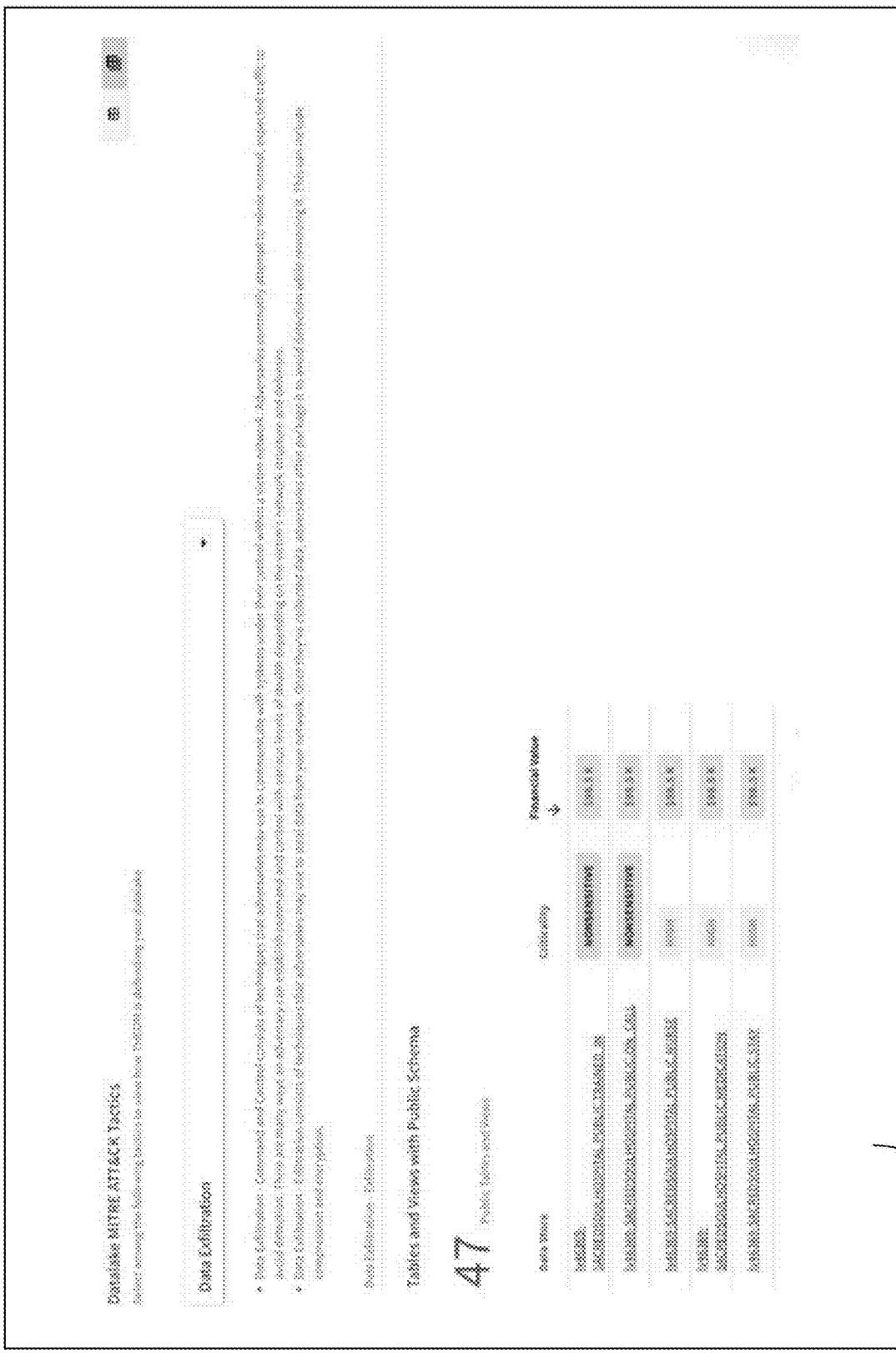

FIGS. 9-10 illustrate screenshots 900-1000 of data exfiltration, according to some embodiments.

FIG. 9 depicts the MITRE attack framework as adapted to the cloud data warehouse context where in the native cloud warehouse operations, including those of sharing, are mapped to the MITRE attack framework. FIG. 9 details how data exfiltration works within cloud warehouses. Attackers can change stages, dump data out using their own pawned encryption keys, do transient share/public access, and breach data out of the enterprise.

FIG. 10 depicts how the adversaries can exfil data out using public views or tables which can be permanent or transient. For a short duration, adversaries can create public views and share the data, and externally breach the data.

Possible CnC channels within a data lake (e.g. Snowflake®, Databricks®, etc.) are now discussed. These can be used in various embodiments discussed herein. These can include Tables (e.g. Create/Clone/Alter Table Commands); Stages (e.g. Internal Stage (e.g. Create/Clone/Alter Stage Commands), S3 Store (e.g. Create/Clone/Alter Stage Commands); Put operations; Pipe operations (e.g. Create/Clone/Alter Pipe Commands); File(s) operations (e.g. Create/Clone/Alter File Format Commands); External Tables (e.g. Create/Clone/Alter External Tables Commands); SnowCLI; Connectors (e.g. New/Modified/Delete of: Python, Spark, Kafka, Go, JDBC, ODBC, .PHP, etc.); Create Session Policy (e.g. Idle timeout, idle timeout UI, etc.); etc.

Figure 11:
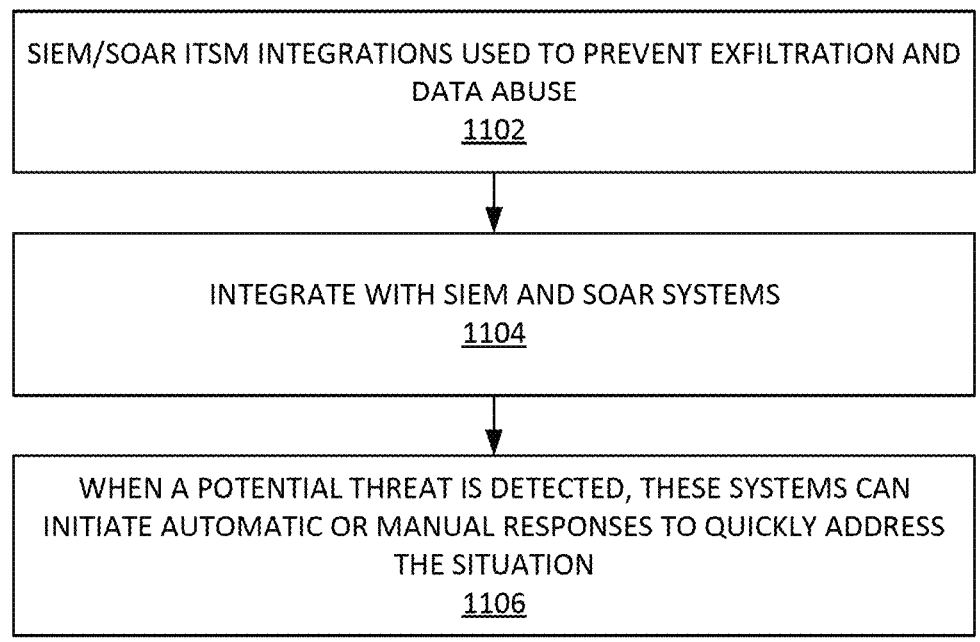
FIG. 11 illustrates an example process for prevent/stop data exfiltration, according to some embodiments.
Figure 12:
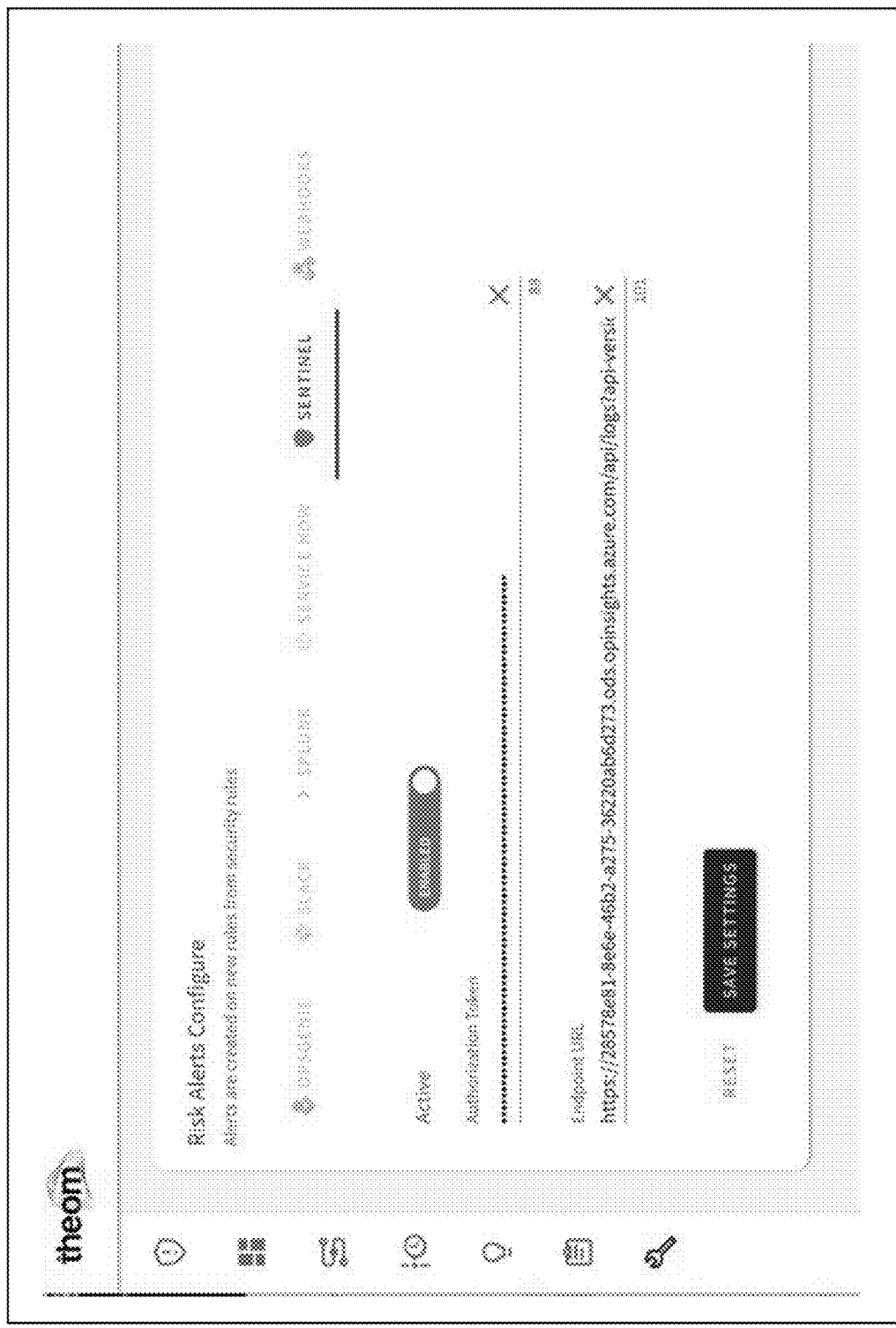
FIGS. 12-20 illustrates example screenshots with some examples of implementations for SIEM/SOAR integrations, according to some embodiments.
Figure 13:
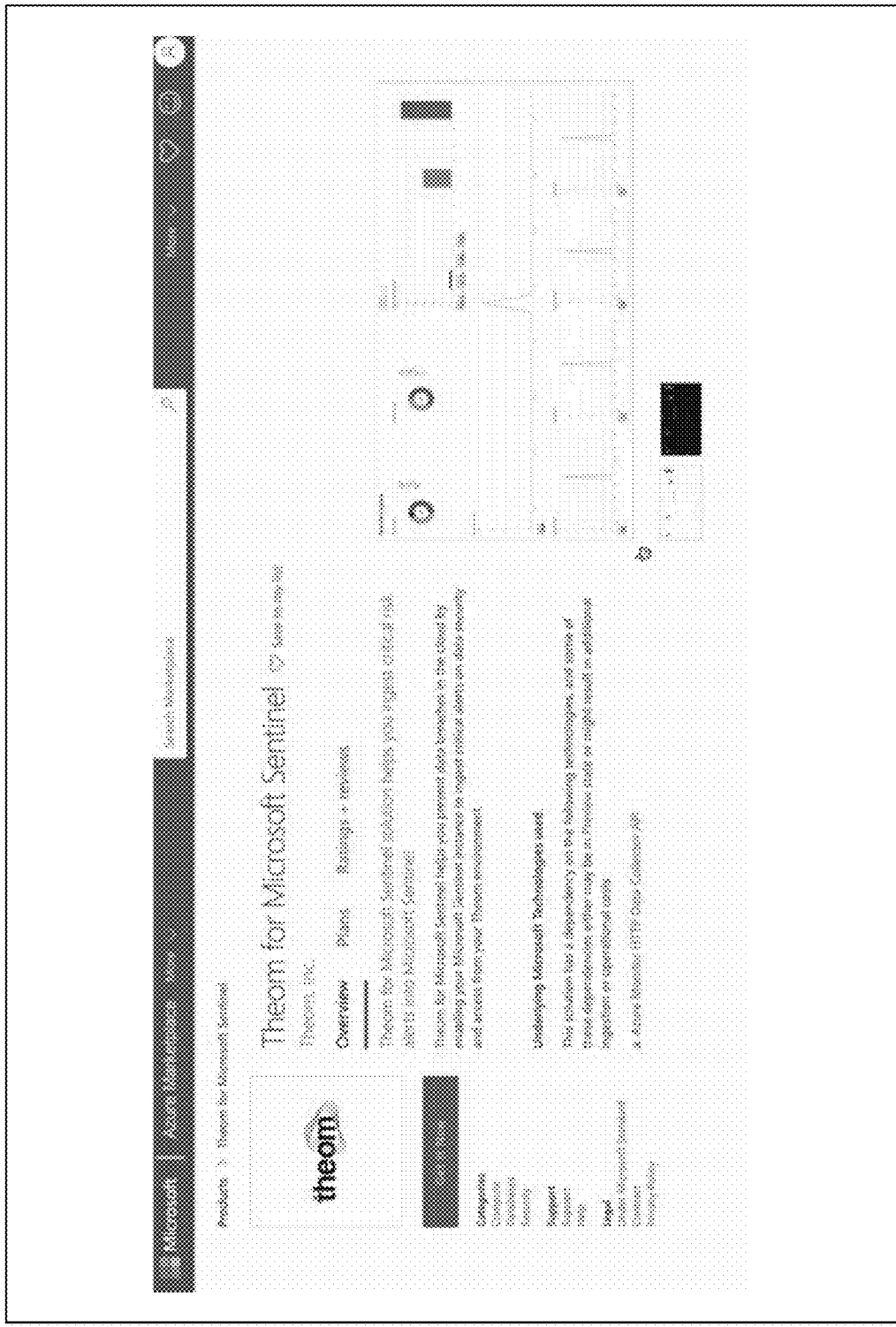
Figure 14:
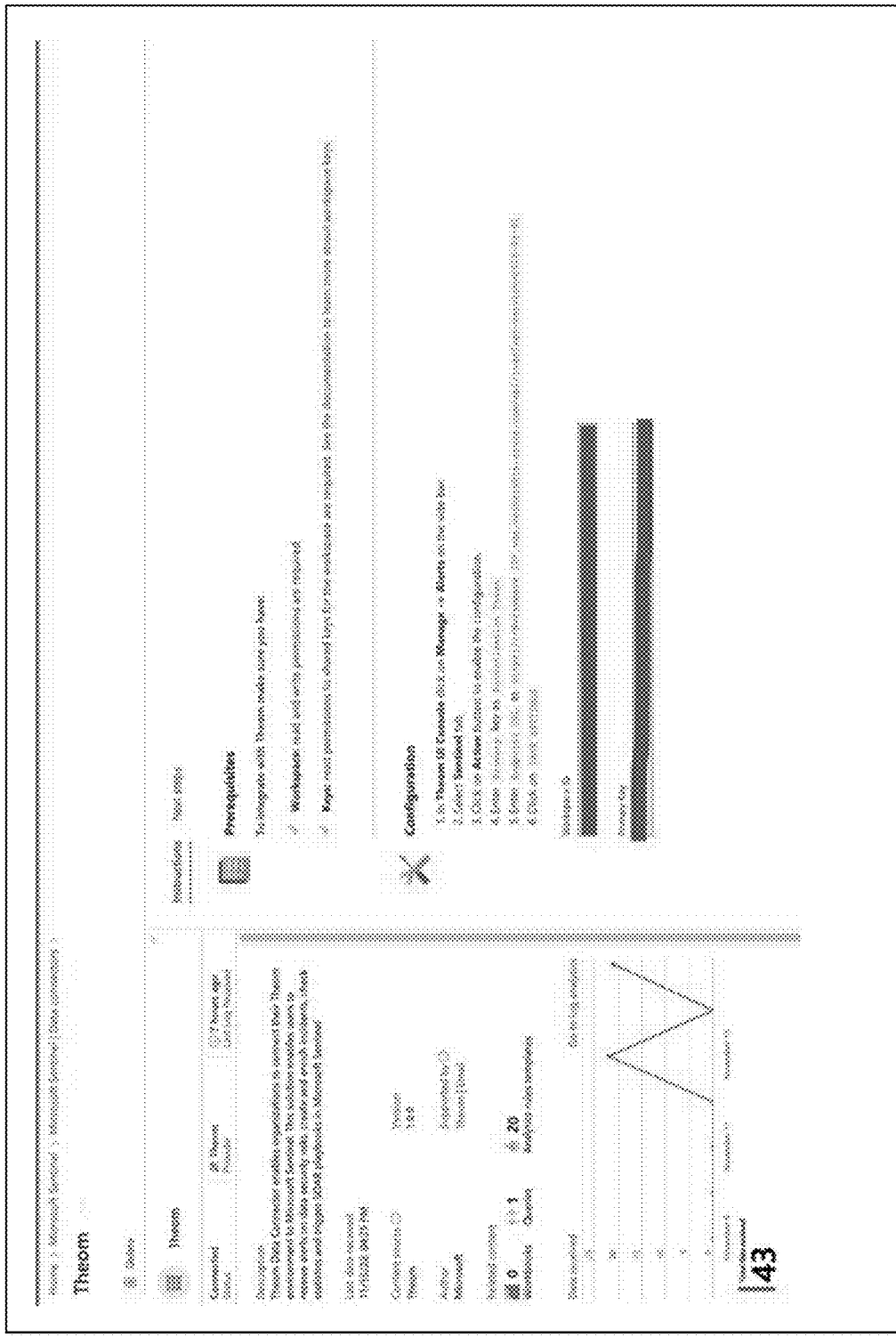
Figure 15:
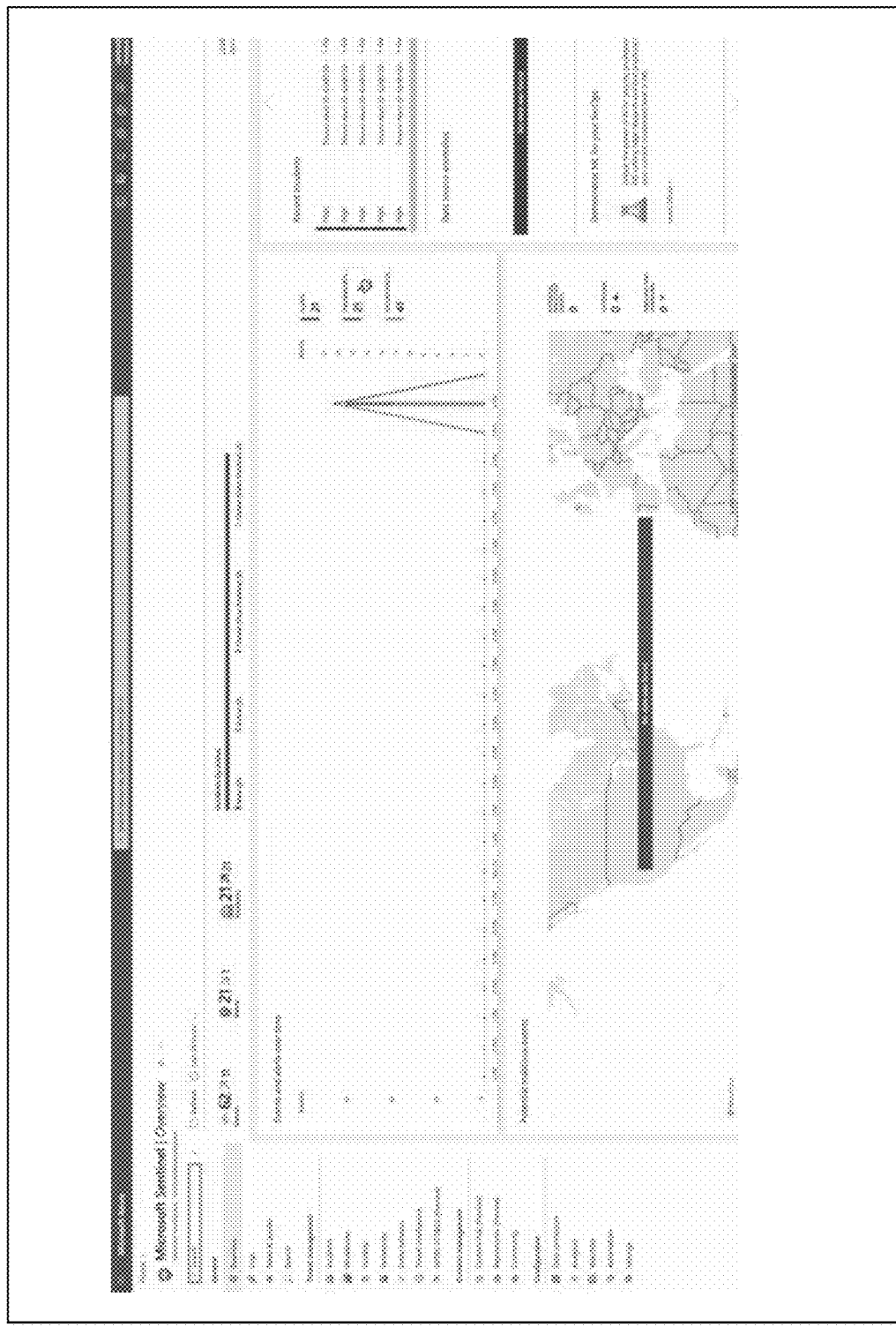
Figure 16:
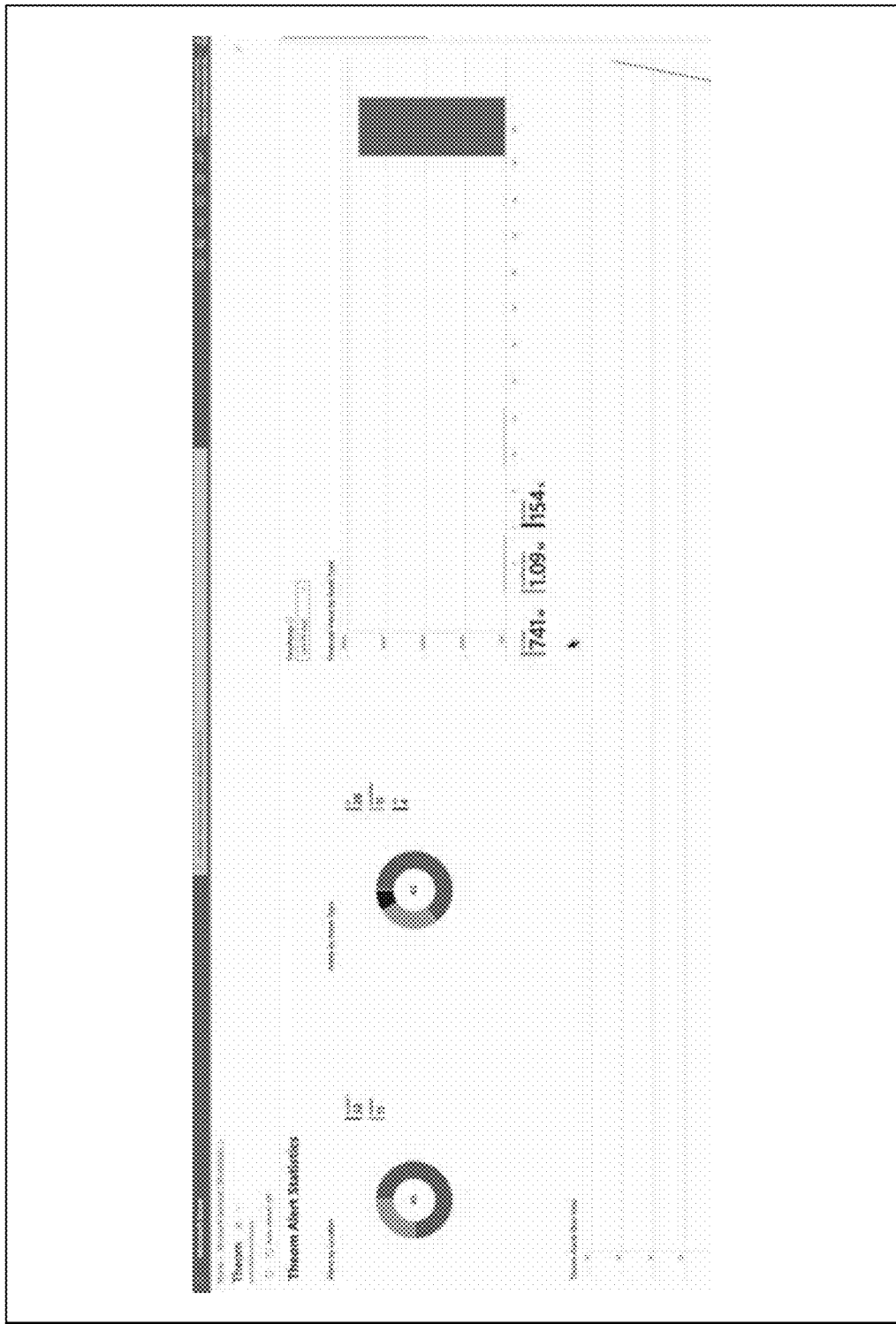
Figure 17:
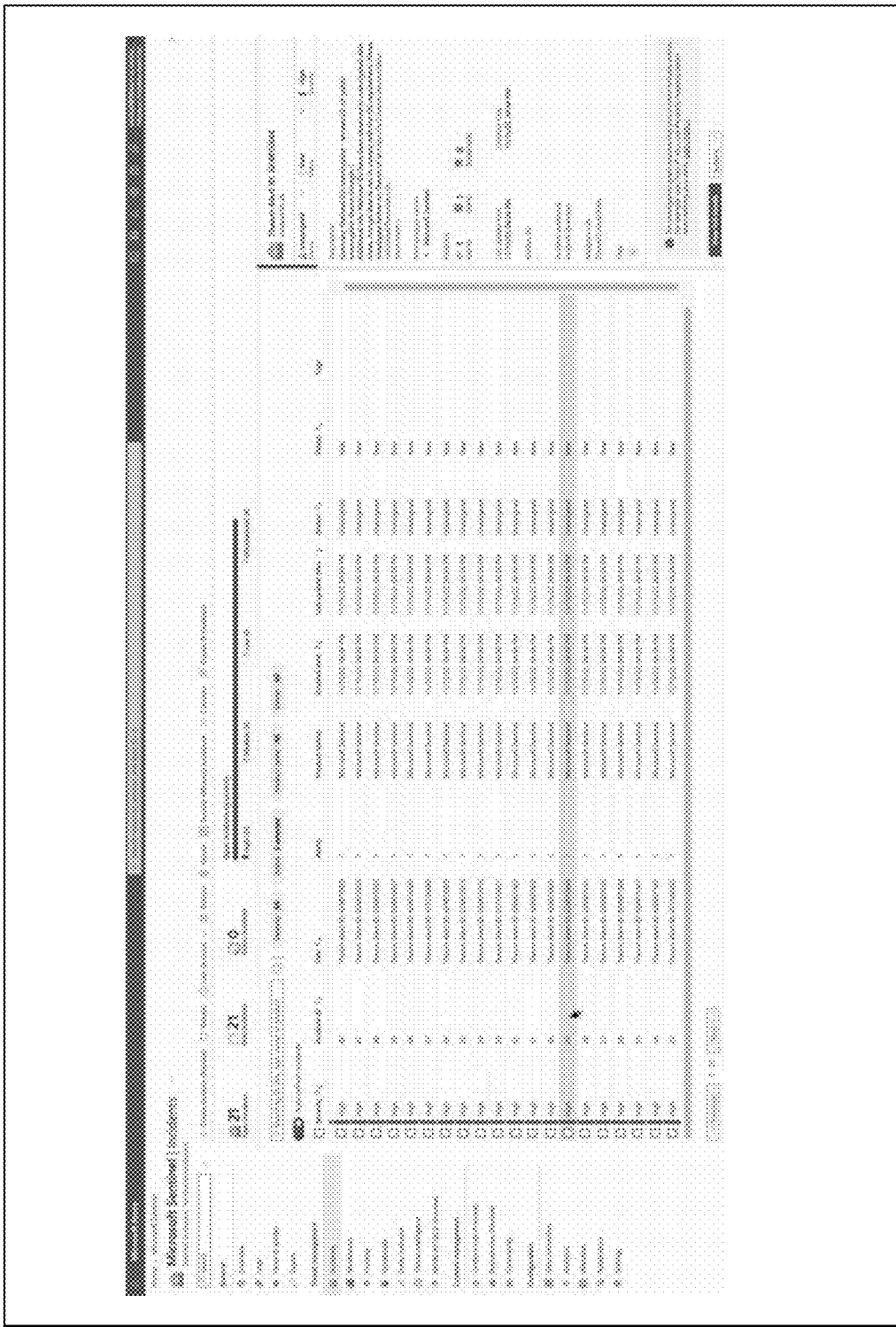
Figure 18:
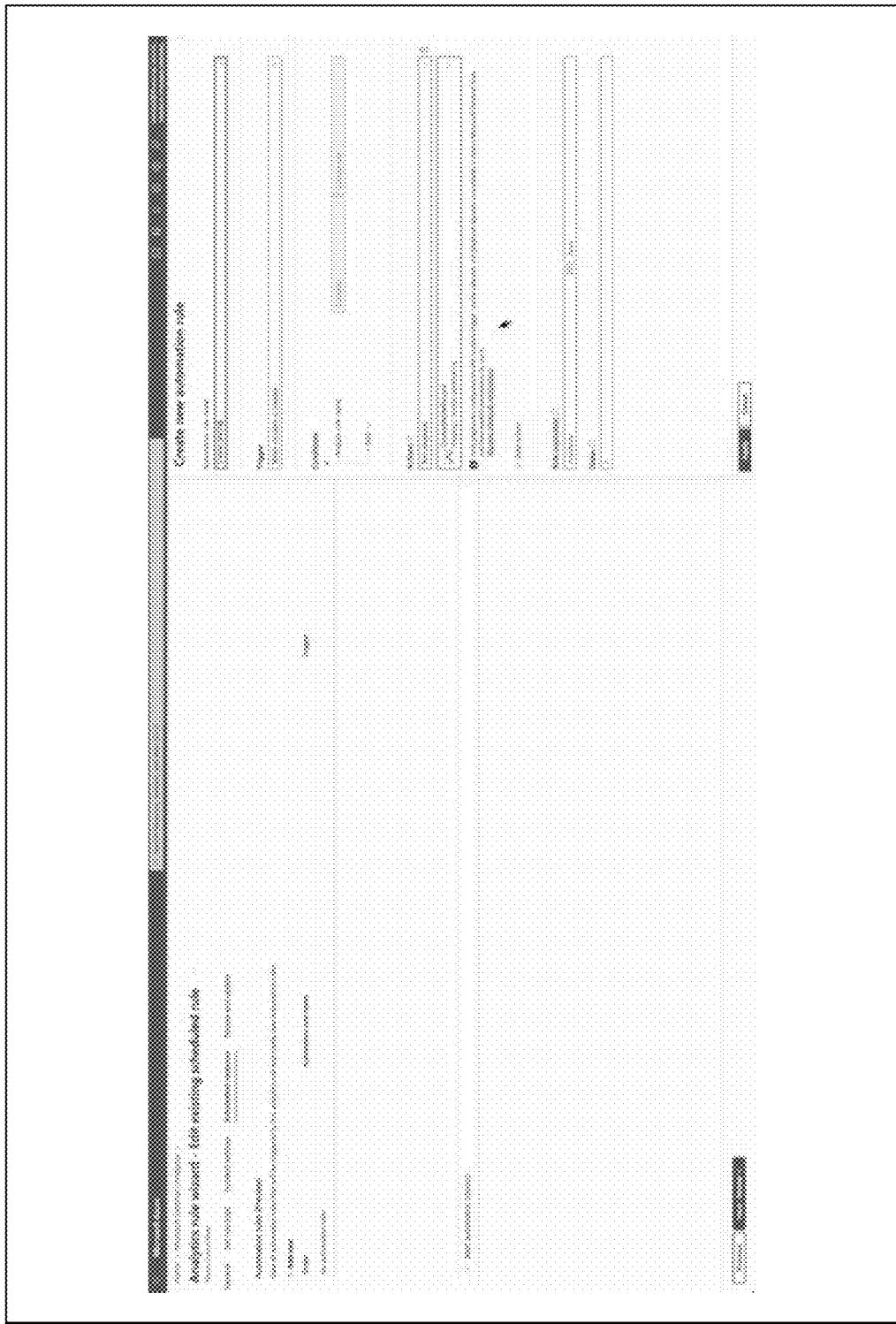
Figure 19:
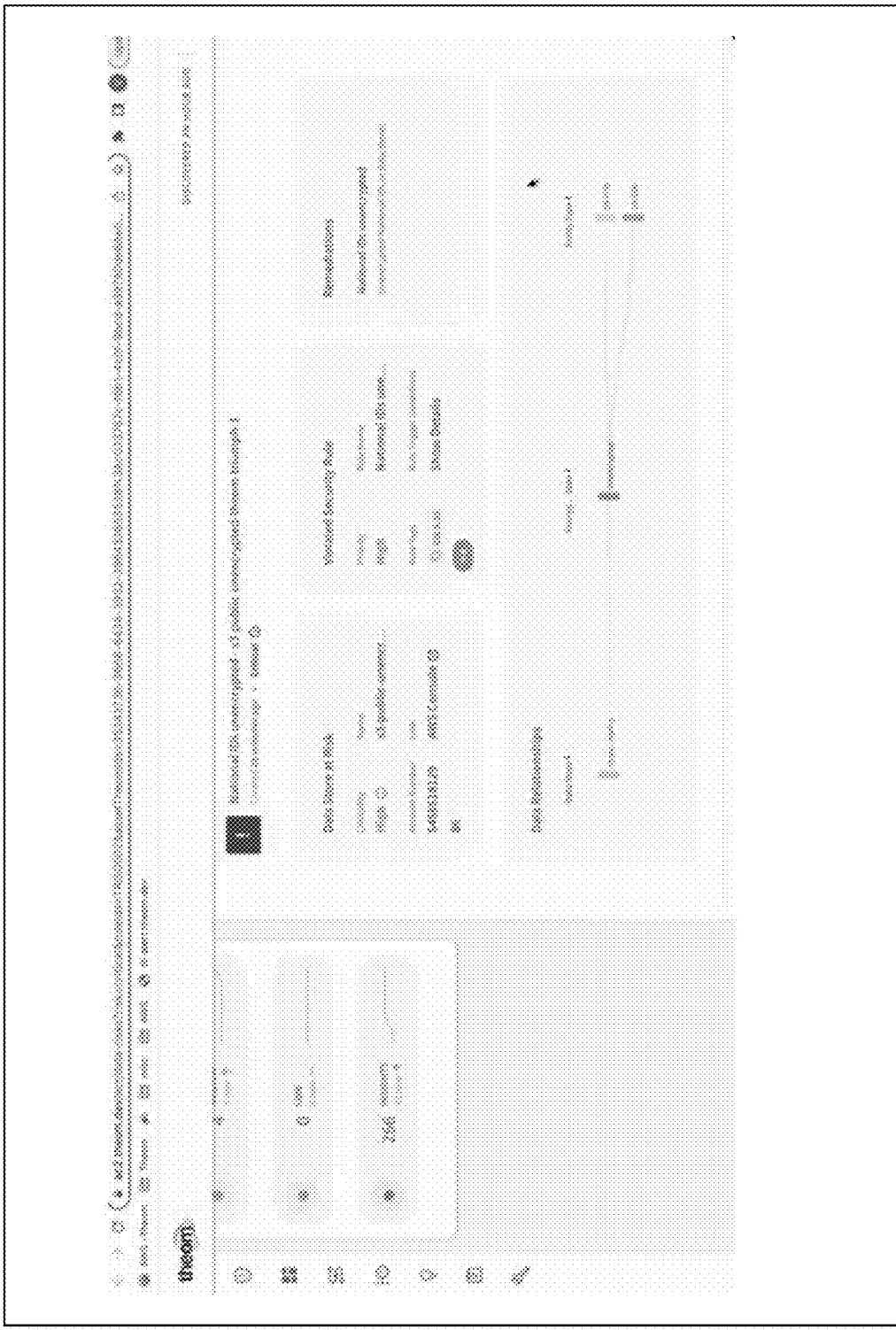
Figure 20:
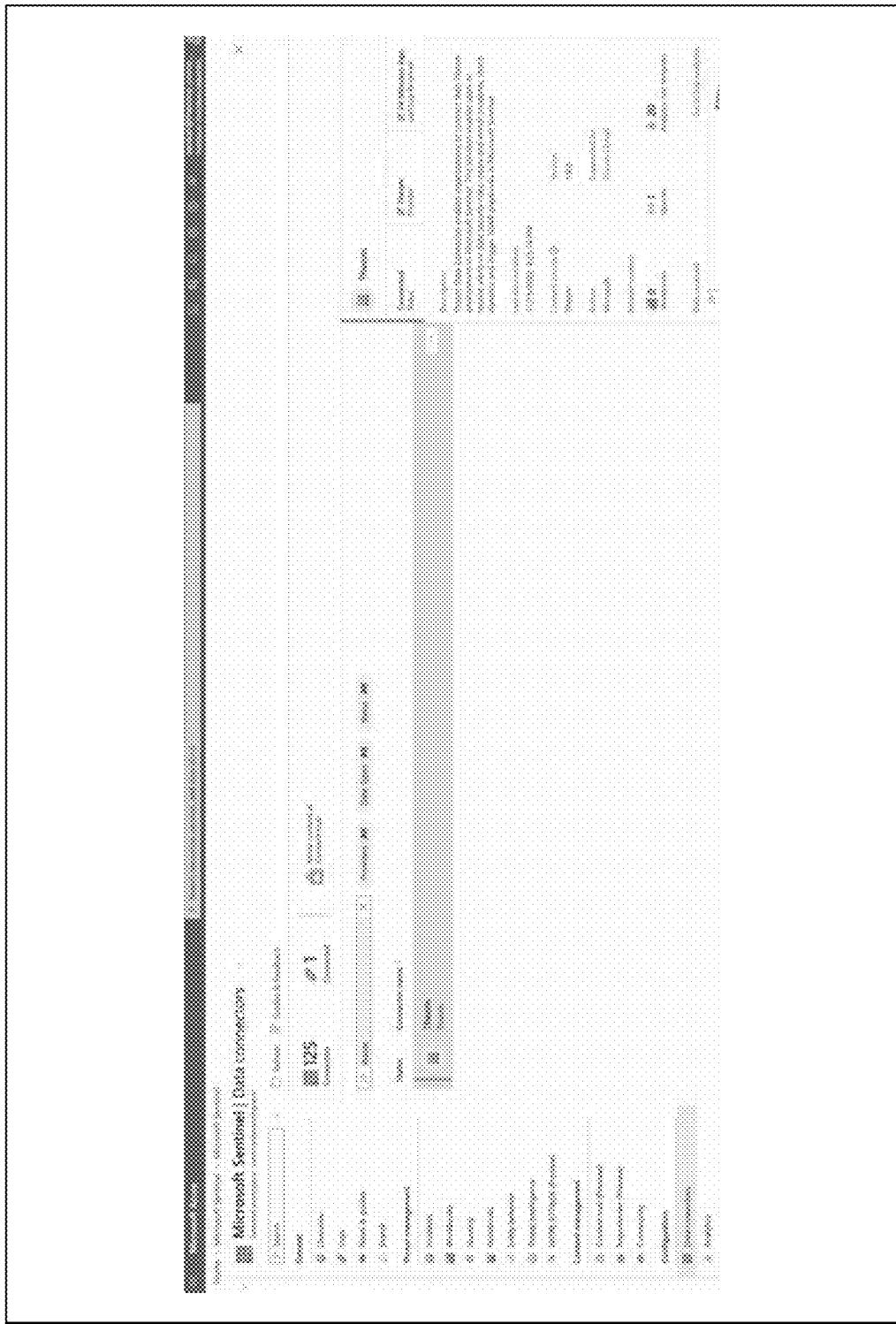

FIG. 11 illustrates an example process 1100 for prevent/stop data exfiltration, according to some embodiments. In step 1102, SIEM/SOAR ITSM integrations can be used to prevent exfiltration and data abuse.

In step 1104, process 1100 integrates with Security Information and Event Management (SIEM) and Security Orchestration, Automation, and Response (SOAR) systems. These integrations allow process 1100 to leverage additional threat intelligence and response capabilities. In step 1106, when a potential threat is detected, these systems can initiate automatic or manual responses to quickly address the situation.

FIGS. 12-20 illustrates example screenshots 1200-2000 with some examples of implementations for SIEM/SOAR integrations, according to some embodiments. FIGS. 14, 15, 16, 17 are from integration with Microsoft Sentinel which is a SIEM/SOAR platform.

FIG. 21 illustrates an example process 2100 used herein, according to some embodiments. Process 2100 is a computerized method for detecting data abuse and data exfiltration in a data store or a data lakes cloud warehouse. In step 2102, process 2100 is used for identifying a plurality of Command and control (CnC) channels in an enterprise data cloud infrastructure. In step 2104, process 2100 is used for identifying and detecting malicious compressed data transfers and encrypted data transfers. In step 2106, process 2100 is used for implementing a destination analysis from within the data store. In step 2108, process 2100 is used for implementing data abuse detection and prevention operations.

Additional Computing Systems

Figure 22:
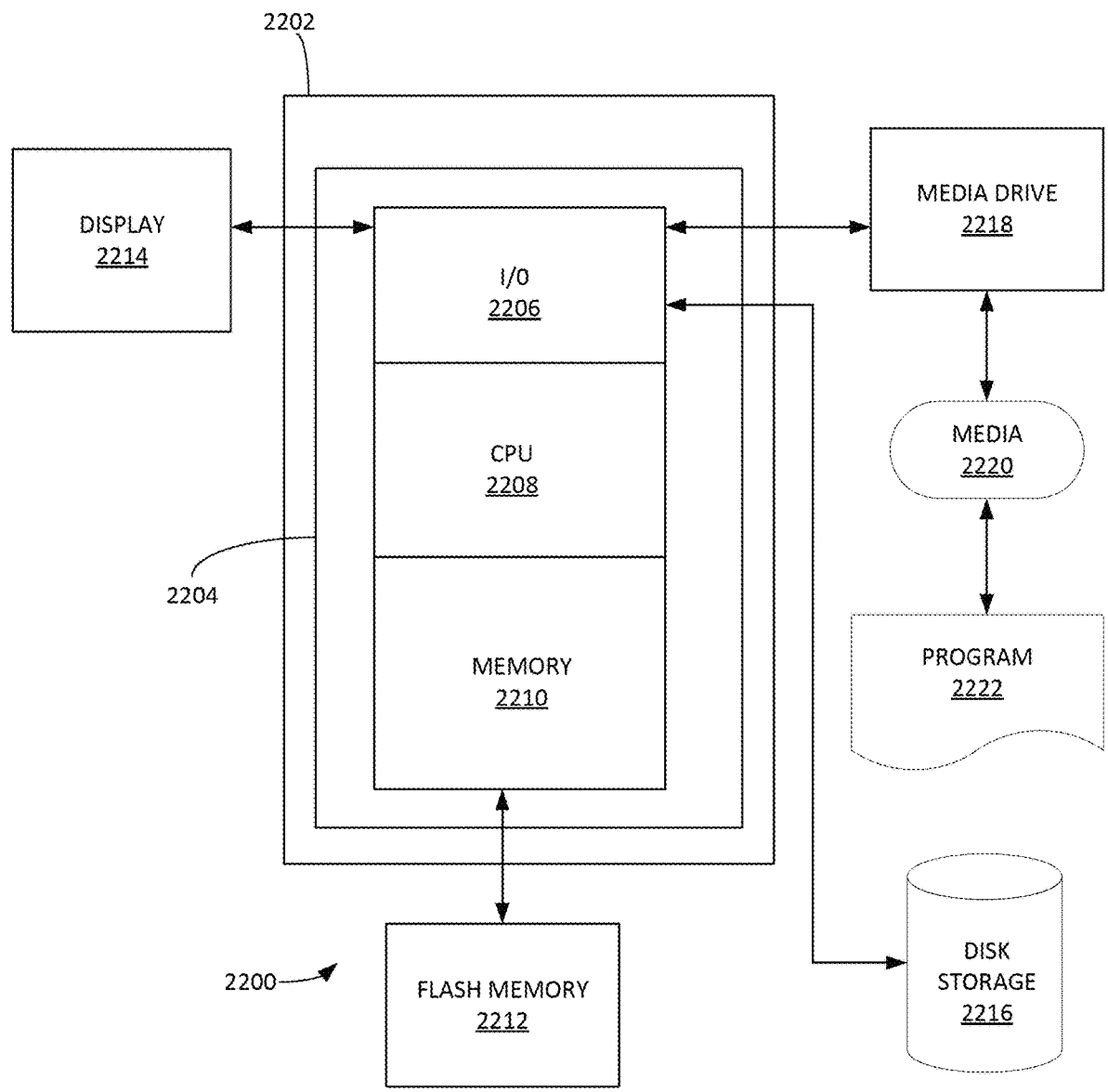
FIG. 22 depicts an exemplary computing system that can be configured to perform any one of the processes provided herein.

FIG. 22 depicts an exemplary computing system 2200 that can be configured to perform any one of the processes provided herein. In this context, computing system 2200 may include, for example, a processor, memory, storage, and I/O devices (e.g., monitor, keyboard, disk drive, Internet connection, etc.). However, computing system 2200 may include circuitry or other specialized hardware for carrying out some or all aspects of the processes. In some operational settings, computing system 2200 may be configured as a system that includes one or more units, each of which is configured to carry out some aspects of the processes either in software, hardware, or some combination thereof.

FIG. 22 depicts computing system 2200 with a number of components that may be used to perform any of the processes described herein. The main system 2202 includes a motherboard 2204 having an I/O section 2206, one or more central processing units (CPU) 2208, and a memory section 2210, which may have a flash memory card 2212 related to it. The I/O section 2206 can be connected to a display 2214, a keyboard and/or another user input (not shown), a disk storage unit 2216, and a media drive unit 2218. The media drive unit 2218 can read/write a computer-readable medium 2220, which can contain programs 2222 and/or databases. Computing system 2200 can include a web browser. Moreover, it is noted that computing system 2200 can be configured to include additional systems in order to fulfill various functionalities. Computing system 2200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Example Machine Learning Implementations

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, which operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (for example in cross-validation), the test dataset is also called a holdout dataset.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by this United States patent:

1. A computerized method for detecting data abuse and data exfiltration in a data store, comprising:
   identifying a plurality of Command and control (CnC) channels in an enterprise data cloud infrastructure by fingerprinting user and application accesses and detecting a plurality of Tactics, Technique, and Procedures (TTPs) inside the data store of the enterprise data cloud infrastructure based on the fingerprinting and corresponding deviations;
   identifying and detecting malicious compressed data transfers and encrypted data transfers;
   implementing a destination analysis from within the data store; and
   implementing data abuse detection and prevention operations.

2. The computerized method of claim 1, wherein identifying the plurality of CnC channels in the enterprise data cloud infrastructure comprises:
   implementing an attack detection and classification from a MITRE ATT&CK framework.

3. The computerized method of claim 2, wherein identifying the plurality of CnC channels in the enterprise data cloud infrastructure comprises:
   natively applying a plurality of techniques that map to a data exfiltration phase of the MITRE ATT&CK framework to the data store in the enterprise data cloud infrastructure, thereby identifying CnC channels that establish stealth modes of breaching data.

4. The computerized method of claim 1, wherein identifying and detecting malicious compressed data transfers and encrypted data transfers comprises:
   detecting that a user uses a user's own key to encrypt data of a targeted data set of the enterprise data cloud infrastructure.

5. The computerized method of claim 4, wherein identifying and detecting malicious compressed data transfers and encrypted data transfers comprises:
   identifying that the user's own key is used, and that the data is a pawned data set; and
   tracking a lineage for the targeted data set and implementing a workflow to quarantine the targeted data set.

6. The computerized method of claim 1, wherein the destination analysis from within the data store comprises:
   integrating with a threat intelligence feed to identify known malicious IP addresses or domain.

7. The computerized method of claim 6, wherein the destination analysis from within the data store further comprises:
   detecting that data is being transferred to a known malicious destination.

8. The computerized method of claim 7, wherein the destination analysis from within the data store further comprises:
   triggering an alert and a remediation workflow on the known malicious IP addresses or domain.

9. The computerized method of claim 7, wherein the destination analysis from within the data store further comprises:
   identifying a malicious IP from within the data store.

10. The computerized method of claim 7, wherein the destination analysis from within the data store further comprises:
    analyzing destinations of data transfers and detecting that a compressed or encrypted data is sent to unknown, untrusted, or suspicious destinations.

11. The computerized method of claim 1, wherein implementing data abuse detection and prevention operations comprises:
    fingerprinting a user behavior in the enterprise data cloud infrastructure with respect to a plurality of tables views accessed, a plurality of queries run, and a plurality of partitions accessed, a time of day of the user behavior, and a day of week of the user behavior.

12. The computerized method of claim 11, wherein implementing data abuse detection and prevention operations further comprises:
    based on fingerprinting the user behavior, determining that an access of a specific user is being abused; and
    generating a list of specific user abuses.

13. The computerized method of claim 12, wherein implementing data abuse detection and prevention operations further comprises:
associating every such abuse of the list of specific user abuses with a pecuniary value of data to make an impact analysis on such an abuse actionable.

14. The computerized method of claim 1, wherein implementing data abuse detection and prevention operations comprises:
analyzing a user behavior to establish an understanding of the user behavior with respect to a role that the user belongs to.

15. The computerized method of claim 14, wherein implementing data abuse detection and prevention operations further comprises:
Using the role that the user belongs to in order to locate another user who is not behaving similar to the user.

16. The computerized method of claim 1, wherein implementing data abuse detection and prevention operations comprises: associating abuses with a pecuniary value of data to make an impact analysis on such an abuse actionable.

17. A computing system including a processor and a memory including a program configured to:
identify a plurality of Command and control (CnC) channels in an enterprise data cloud infrastructure by fingerprinting user and application accesses and detecting a plurality of Tactics, Technique, and Procedures (TTPs) inside a data store of the enterprise data cloud infrastructure based on the fingerprinting and corresponding deviations;
identify and detect malicious compressed data transfers and encrypted data transfers;
implement a destination analysis from within the data store; and
implement data abuse detection and prevention operations.

18. The computing system of claim 17, wherein the program configured to implement data abuse detection and prevention operations associates abuses with a pecuniary value of data to make an impact analysis on such an abuse actionable.

19. A non-transitory computer-readable medium including a program configured to:
identify a plurality of Command and control (CnC) channels in an enterprise data cloud infrastructure by fingerprinting user and application accesses and detecting a plurality of Tactics, Technique, and Procedures (TTPs) inside a data store of the enterprise data cloud infrastructure based on the fingerprinting and corresponding deviations;
identify and detect malicious compressed data transfers and encrypted data transfers;
implement a destination analysis from within the data store; and
implement data abuse detection and prevention operations.

20. The non-transitory computer-readable medium of claim 19, wherein the program configured to implement data abuse detection and prevention operations associates abuses with a pecuniary value of data to make an impact analysis on such an abuse actionable.

* * * * *